Dec. 15, 1964  M. M. DANHI  3,161,219
MULTI-COMPARTMENT VEHICLE TIRE
Filed Nov. 1, 1962
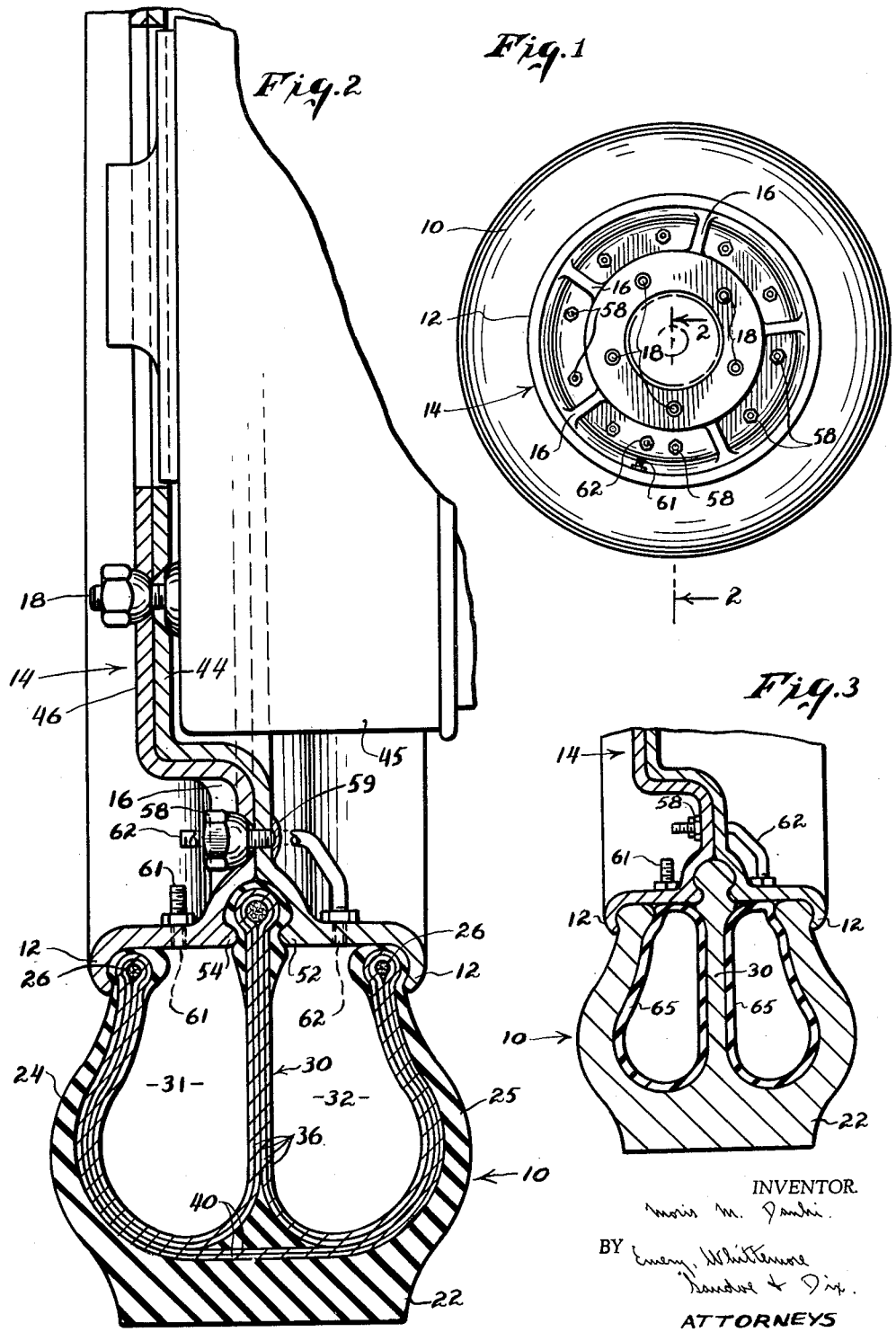
INVENTOR.
Morris M. Danhi
BY Emery, Whittemore,
Dunsdee & Dix
ATTORNEYS

3,161,219
MULTI-COMPARTMENT VEHICLE TIRE
Morris M. Danhi, 2152 E. 47th St., Brooklyn, N.Y.
Filed Nov. 1, 1962, Ser. No. 234,634
9 Claims. (Cl. 152—339)

This invention relates to vehicle tires and more especially to pneumatic tires.

It is an object of this invention to provide an improved pneumatic tire which contains separate compartments so that in the event of a puncture or blowout of one compartment, the tire loses only a part of its air and does not become completely flat.

It is another object of the invention to provide a pneumatic vehicle tire, of the character indicated, which is of simpler construction than multi-compartment tires of the prior art, and which is easier to repair because of the fact that all parts of the interior of the tire are accessible when the tire is removed from the rim with which it is used.

Still another object is to provide a tire-and-wheel combination with the wheel made in two parts that fit together axially and that clamp a tire casing partition between them to divide the tire into different air compartments.

Although the invention can be used with tires having tubes, it is intended primarily for tubeless tires; and the preferred embodiment described herein is a tubeless tire.

Other objects, features and advantages of the invention will appear or be pointed out as the description proceeds.

In the drawing, forming a part hereof, in which like reference characters indicate corresponding parts in all the views:

FIGURE 1 is a side elevation of a vehicle wheel and tire made in accordance with this invention;

FIGURE 2 is a greatly enlarged sectional view taken on the line 2—2 of FIGURE 1; and FIGURE 3 is a view, similar to FIGURE 2 on a reduced scale, showing the tire equipped with tubes.

FIGURE 1 shows a tire 10 mounted on a rim 12 of an automobile wheel 14. The wheel 14 has radial corrugations 16 for providing greater stiffness and the wheel is attached to the driving hub of the automobile by fastening means, such as bolts or studs 18.

FIGURE 2 shows the construction of the tire 10. This tire has a conventional tread portion 22 and side walls 24 and 25. The side walls are flexible, in accordance with the usual construction, and they terminate in beads 26 which contact with the rim 12 of the wheel 14.

Within the tire 10 there is a partition 30 dividing the tire into two separate air compartments 31 and 32. This partition 30 can be connected with the tire in a number of ways; but in the preferred embodiment the partition 30 is of one-piece construction with the tire casing. The drawing shows a plurality of inner plies 36, of the tire casing, extending along the inside portion of the side wall 24 and then inwardly along the partition 30 to a bead 38 at the inner edge of the partition 30. The plies 36 then extend around the bead 38 with a reverse bend and back along the partition and then along the inside of the other side wall 25. Outer plies 40 extend across the tread portion 22 without being deflected into the partition 30. All of the plies are bonded together in accordance with conventional tire construction.

For greater clearness in the illustration, the tire is shown with comparatively few plies, but it will be understood that the tires of this invention may be made with any desired number of plies. It is important, however, that the partition 30 have a flexibility comparable to that of the side walls 24 and 25, since it must flex when the side walls flex under load.

The wheel 14 is of composite construction. It includes an inner part 44 which is of a contour to fit over a driving hub 46 of the vehicle on which the wheel is mounted. The wheel 14 has an outer part 48 which has a complementary inner face fitting against the outer face of the wheel part 44. These wheel parts 44 and 48 are attached to the driving hub 46 by the fastening means comprising studs or bolts 18, previously described.

The rim 12 is also of composite construction with part of the rim on each of the wheel parts 44 and 48. The part of the rim on the inner wheel part 44 terminates in a circumferential lip 52; and the part of the rim which is on the outer wheel part 48 terminates in a corresponding circumferential lip 54. These lips 52 and 54 clamp the partition 30 between them. In the illustrated construction, the bead 38 is located immediately inward from the lips 52 and 54 so as to prevent the partition 30 from pulling loose from the lips 52 and 54 when the partition 30 is subject to substantial strain, as when turning corners at high speed. This bead also serves to prevent the partition from pulling loose in the event of a blowout, which subjects the tire to unusual and unbalanced transverse forces.

In order to hold the wheel parts 44 and 48 together, and to clamp the partition 30 between the lips 52 and 54, when the tire and wheel are not on a driving hub, there are fastenings comprising bolts or studs 58 at angularly-spaced locations around the wheel 14. These studs 58 are preferably located radially inward from the lips 52 and 54, and far enough inward so that the studs 58 clear the inner edge or bead 38 of the partition 30. The studs 58 screw into the part 44 and are preferably secured by spot welding 59 or other means for holding them from turning and from coming out of the inner part 44 of the wheel.

There are valve stems 61 and 62 extending through the inner and outer parts of the rim 12, and equipped with the conventional tire valves, for inflating the respective air compartments 31 and 32 of the tire 10.

The invention can be used with tubes 65 (FIG. 5). When used with tubes, it is necessary to provide the usual passages through the rim for the valve stems of the tubes, but otherwise the construction may be similar to that illustrated in FIGURE 2.

The preferred embodiment of the invention has been illustrated and described, but changes and modifications can be made and some features can be used in different combinations without departing from the invention as defined in the claims.

What is claimed is:

1. A vehicle tire including a hollow casing having a tread portion and side walls extending radially inward from the tread portion on both sides thereof, a partition connected with the tread portion and extending radially inward from the inside of the tread portion and dividing the space within the tire into two compartments, the partition being imperforate for preventing flow of fluid from one of said compartments to the other, and extending radially inward for a substantially greater distance than the side walls of the tire, and having an increased thickness extending from an inner end portion of the partition continuously outward to another portion of the partition where the radius of the partition is greater than the radius of the inside edges of the side walls for distortion to provide a seal between clamping jaws of a split rim by which the inner end of the partition is intended to be held.

2. The vehicle tire described in claim 1 characterized by the partition being formed by a plurality of plies of the casing, some of which extend from each of the side walls, and the thickened portion of the partition including a bead at the inner end of the partition and outside of which the plies pass, and the thickened portion including also a substantial thickness of rubber covering the outside of the plies for the part of the partition adjacent to the bead and outward to the other portion of the partition where the radius of the partition is greater than the radius of the inside edges of the side walls.

3. The vehicle tire described in claim 1 characterized by the partition having a bead at its inner end and the casing being made of a multi-ply construction with plies extending up one side wall, across the tread portion with substantially no deflection and down the other side wall and then reversing and extending back up that side wall and down the partition and around the bead of the partition and back up the other side of the partition and over and down the other side of the first side wall.

4. The vehicle tire described in claim 1 characterized by the tire being a tubeless tire with beads at the inner ends of both side walls and rubber over the beads in position and of a consistency to form seals against the rim to prevent escape of air from within the spaces on both sides of the partition.

5. The combination comprising a vehicle tire including a hollow casing having a tread portion and side walls extending radially outward from the tread portion on both sides thereof, the partition being connected with the tread portion and extending radially inward from the inside of the tread portion and dividing the space within the tire into two compartments, the partition being imperforate for preventing flow of fluid from one of said compartments to the other, and the partition having an inner end portion that extends inward beyond the inner limits of the side walls with a thickened part toward the inner end, and a split rim having circumferential faces against which the side walls are supported, the split rim having depressed clamping faces below the level of the circumferential faces and at which opposite halves of the rim confront one another for gripping the inner portion of the partition between them, angularly spaced means clamping the opposite halves of the rim together at locations adjacent to but radially inward from the clamping faces, the rim immediately inward from the clamping means being offset from the plane of the circle in which the partition is clamped, and angularly spaced reinforcing portions of the rim between successive angularly spaced means that clamp the opposite halves of the rim together, said reinforcing portions extending radially beyond the clamping means both inwardly and outwardly thereof and spanning the space between the offset and a back of the clamping face of the rim on which the reinforcing portions are located.

6. The combination described in claim 5 characterized by both halves of the rim being offset and both halves having confronting faces at the offset and radially inward and outward from the offset in contact with one another, the parts of the rim inward from the offset extending in planes normal to the axis of rotation of the rim and having detachable means for connecting the rim with the hub of an automotive vehicle, and the reinforcing portions being on the outside face of the rim which is remote from the hub of the automotive vehicle when the rim is attached to such a hub.

7. The combination described in claim 6 characterized by the clamping means for the rim being self-centering bolts and said detachable means extending through both halves of the rim and also being self-centering bolts whereby the different halves of the rim cannot be separated to release the partition of the tire without first removing the detachable means that connect the rim with a hub, as well as the means that clamp the halves of the rim together adjacent to the clamping faces of the rims.

8. The combination comprising a vehicle tire including a hollow casing having a tread portion and side walls extending radially inward from the tread portion on both sides thereof, a partition connected with the tread portion and extending radially inward from the inside of the tread portion and dividing the space within the tire into two compartments, the partition being imperforate for preventing flow of fluid from one of said compartments to the other, and the partition having an inner end portion that extends inward beyond the inner limits of the side walls with a thickened part toward the inner end of the partition, and a split rim having circumferential faces against which the side walls are supported, the split rim having depressed clamping faces below the level of the circumferential faces at which opposite halves of the rim confront one another for gripping the inner portion of the partition between said clamping faces, angularly spaced means clamping the opposite halves of the rim together at locations adjacent to but radially inward from the clamping faces, the rim immediately inward from the clamping means being offset from the plane of the circle in which the partition is clamped, both halves of the rim being offset and both halves having confronting faces at the offset and radially inward and outward from the offset in contact with one another, the parts of the rims inward from the offset extending in planes normal to the axis of rotation of the rim and having detachable means for connecting the rim with the hub of an automotive vehicle, and the reinforcing portions being on the outside face of the rim which is away from the hub when the rim is connected with the hub of an automotive vehicle.

9. The combination described in claim 8 characterized by the tire being a tubeless tire with sealing rubber in contact with the rim at the inner edges of the side walls and with other rubber on the partition increasing the thickness of the partition over the radial height of the partition extending from a region where the radius of the partition is substantially less than the inside radius of the side walls to a region where the radius of the partition is substantially greater than the inside radius of the side walls, said other rubber being of a consistency to form a seal and being clamped and distorted between the clamping faces of the opposite halves of the rim, said clamping faces being of rounded contour along the lines where their contact with said other rubber begins, valve stems extending through the respective halves of the rim, one of the valve stems being offset in the same direction as the halves of the rim are offset.

References Cited in the file of this patent

UNITED STATES PATENTS

| | | |
|---|---|---|
| 2,045,860 | Knapp | June 30, 1936 |
| 2,052,416 | Mills | Aug. 25, 1936 |
| 2,641,295 | Des Rosiers | June 9, 1953 |
| 2,990,869 | Riley | July 4, 1961 |

FOREIGN PATENTS

| | | |
|---|---|---|
| 513,690 | Italy | Feb. 5, 1955 |